May 10, 1949.    W. R. SPILLER ET AL    2,469,900
DRILL SHARPENER

Filed Oct. 12, 1945    2 Sheets-Sheet 1

Inventors
William R. Spiller and
Lloyd L. West

By Marechal & Biebel
Attorneys

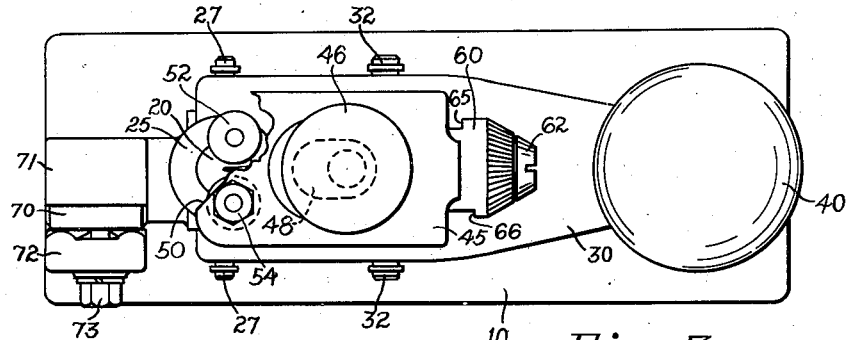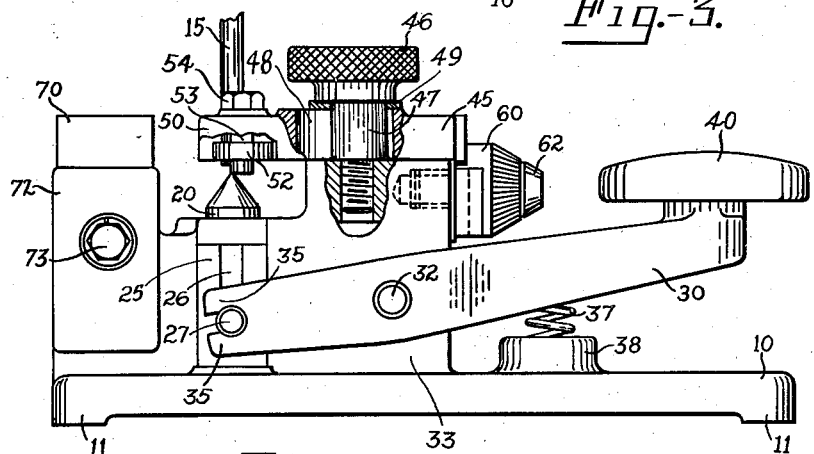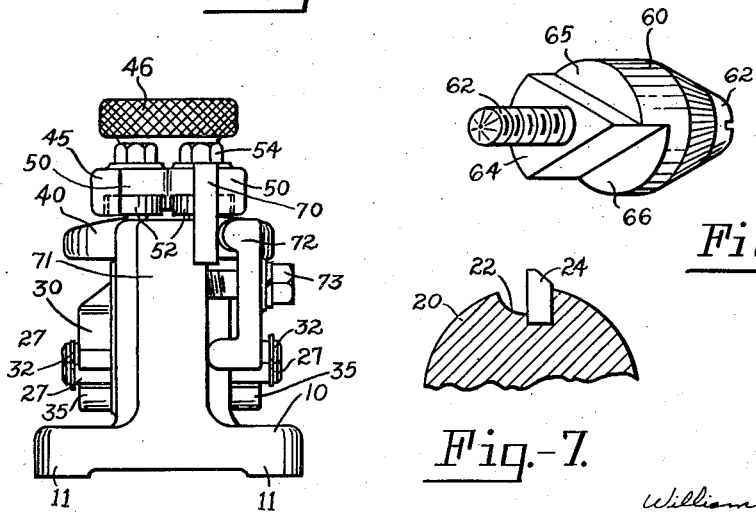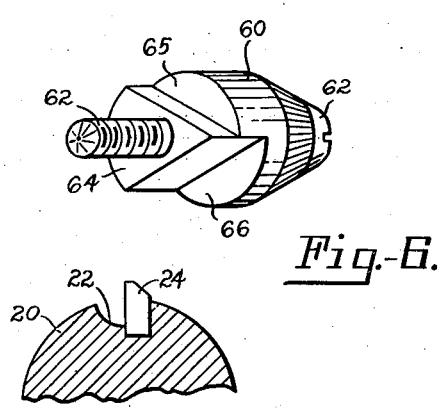

Patented May 10, 1949

2,469,900

UNITED STATES PATENT OFFICE 2,469,900

DRILL SHARPENER

William R. Spiller and Lloyd L. West, Dayton, Ohio, assignors to Harris-Seybold Company, Cleveland, Ohio, a corporation of Delaware Application October 12, 1945, Serial No. 622,020

13 Claims. (Cl. 76—82)

This invention relates to drilling equipment and more particularly to a sharpener therefor.

It is the principal object of the invention to provide a sharpener for a hollow drill which is simple in construction and operation, and which provides for sharpening the drill rapidly and accurately without requiring the removal of the drill from its spindle.

It is also an object to provide a sharpener for a hollow drill such as a paper drill which may be quickly and easily operated to sharpen one or a series of such drills while the drills remain supported in their normally operative positions and driven by their own drive spindles.

It is a further object to provide such a sharpener which automatically finds its proper centering position with reference to the outside diameter of the drill to form an accurate edge on the drill assuring precision and uniformity of operation.

It is also an object to provide such a sharpener incorporating a hone which may be brought into operative relation with the drill to remove any burr or wire edge which may be left after the sharpening action.

It is a still further object to provide a single, light weight, readily portable device of this character which can be utilized for the sharpening of a wide range of drill sizes.

In the drilling of paper, or other similar materials, a hollow cylindrical drill is utilized which has its lower open end sharpened and with an internal bevel to provide a proper cutting action as it is moved relative to the work material while being rotated. Such drilling equipment requires frequent attention in order that it may be kept in sharpened condition to provide for proper cutting action, and particularly with some types of work material this necessitates rather frequent sharpening. In many cases a whole series of such drills are arranged to operate together, and the problem of maintaining all of them in proper cutting relation and sufficiently sharp is one which entails substantial time and thus delays the normal work which the drills are called upon to do.

In accordance with the present invention the sharpening of one or a series of such drills is made a very simple matter. The drill is not removed from its spindle, and hence no time is lost in the removal of the drill from its spindle, its mounting in a sharpening fixture, and its later return to its normal operating position. The drill remains in its operating position at all times, and is rotated by its regular drive spindle during the sharpening operation. It will thus be evident that the proper relationship of the drill is maintained and it may be accurately sharpened while in its normal operative position so that there is no danger of the drill getting out of alignment or being assembled in some different position from that desired after having been sharpened in a separate fixture.

Further, the device itself is extremely simple, easily portable, and is so arranged that it automatically centers itself during the sharpening operation, thus assuring the production of a properly sharpened end which will have the desired accuracy of alignment and relationship to a working surface upon which the work material is received. The device does not require any power operation, and both the tool and the hone are non-rotatably mounted so that the device is both simple in construction and capable of long life without requiring adjustment or repair. It further provides for careful manual operation so that the operator can tell by experience the proper pressures to apply in order to secure the best results, for different size drills. The device may be adjusted for different size drills and is thus adaptable for sharpening a wide range of drill sizes. It is light in weight, readily portable to the drill stand in which the drills are to be sharpened, and is simple and inexpensive in manufacture and repair.

Referring to the drawings which disclose a preferred embodiment of the invention, Fig. 1 is a view in perspective of the sharpening device of this invention showing the relationship thereof with a drill in both the sharpening position and the honing position, the latter being shown in dotted lines;

Fig. 3 is a plan view of the device with certain portions being broken away;

Fig. 4 is a side elevational view with parts being shown in section;

Fig. 5 is an end elevational view of the device.

Fig. 6 is a perspective view showing indexing means for determining the setting of the device for different size drills;

Fig. 7 is a horizontal sectional view through the tool itself approximately on the line 7—7 of Fig. 2.

Figures 2, 8:
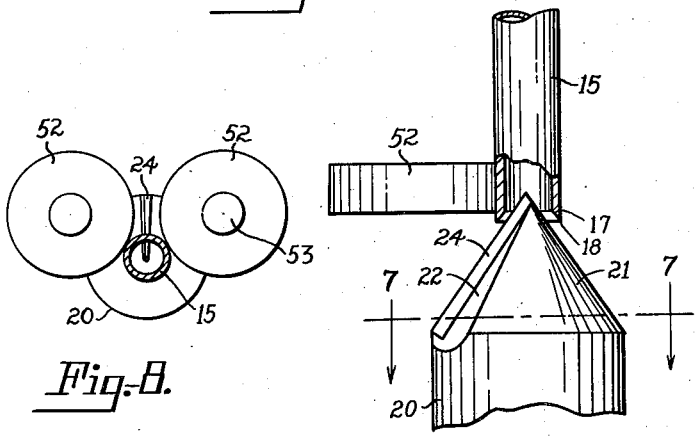
Fig. 2 is a view on an enlarged scale showing the tool projecting into the lower end of the hollow drill.
Fig. 8 is a schematic view showing the relationship of the single sharpening tool, the drill, and the guiding and supporting rollers.

As is shown, the device comprises a base member 10 which has integrally formed foot portions 11 at its four corners, such portions being relatively smooth and therefore capable of sliding movement upon the usual work table provided in conjunction with the drill stand in which the drills are mounted. The drill stand is not illustrated, the drill, however, being shown at 15 supported from a spindle 16 which provides for rotation of the drill and for vertical travel thereof to bring it into working relation with the work material. As shown in Fig. 2, the drill is cylindrical and hollow and has a beveled cutting edge 17 at its lower end, providing a sharp edge 18 which is forced into the work material during the cutting operation. As shown in this view, it is important that the outside wall and lower edge of the drill be square and that the edge be sharp and accurately formed in order to provide the proper operating characteristics.

The sharpening tool is shown at 20 comprising a cylindrical body member having a conical upper end 21 which is milled out as shown at 22 to receive a single cutting tool, such as a piece of high speed tool steel shown at 24. This cutting element is extremely hard and is ground to the proper shape to provide the correct angle of bevel when brought into operative relation with the end of the drill.

The tool 20 is mounted in an integral portion 25 which projects upwardly from the base 10 forming a guide socket therefor. The socket 20 is slotted as shown at 26 on its opposite sides and pins 27 which are fastened into the lower portion of the tool body 20 project through the slots forming actuating arms on opposite sides of the tool, and also preventing rotational movement of the tool.

In order to actuate the tool upwardly into sharpening relation with the drill, lever 30 is provided which is adjustably mounted upon pins 32 fixed to a centrally projecting post or member 33, also suitably formed integrally with the base. The end of lever 30 has bifurcated arms 35 each of which engages over one of the pins 27, thus providing for the raising of the tool when the lever is depressed. A spring 37 acting against a boss 38 fixed to the base normally urges the lever into its raised position, causing the lowering of the tool to its bottom or inoperative position. A pad 40 is provided at the end of the lever in convenient position for operation by hand, thus enabling the operator manually to raise the tool and press it into proper operative relation with the drill.

In order to provide for the guiding and self-centering action of the tool during the sharpening operation, guide members are provided which have working engagement with the outer wall of the drill and which thus establish the proper correlated relation between the drill and the tool, assuring that the lower cutting edge of the drill will be square, and that the internal bevel will be concentric with the body of the drill. For this purpose the central upwardly projecting member 33 supports a slide 45 on its upper end which is adjustable thereon in a horizontal plane. A fastening bolt 46 is threaded into the body of member 33, and is provided with an enlarged shank portion 47 which is free of threads and which has guiding engagement with an elongated slot 48 formed in slide member 45. A lock washer 49 is also provided so that when the bolt 46 is turned down the slide member 45 will not move with respect to the support 33.

With this construction it will be evident that upon the loosening of the bolt 46, the slide member 45 may be moved in a horizontal plane as provided by the elongated slot 48, and may be secured in fixed position upon the device by the tightening of bolt 46. The slide 45 overhangs the support 33 and is formed with a V-shaped open end as shown at 50. A pair of guide members 52, preferably in the form of rollers, are mounted in the overhanging end portions 50 of the slide. The rollers are freely rotatably mounted on the respective shafts 53 which are secured by means of nuts 54. The rollers are supported adjacent the lower face of the slide as shown in Fig. 4 and their outer peripheries overhang or project inwardly of the V-shaped open ends of the slide member, as indicated in Fig. 3.

Figure 1:
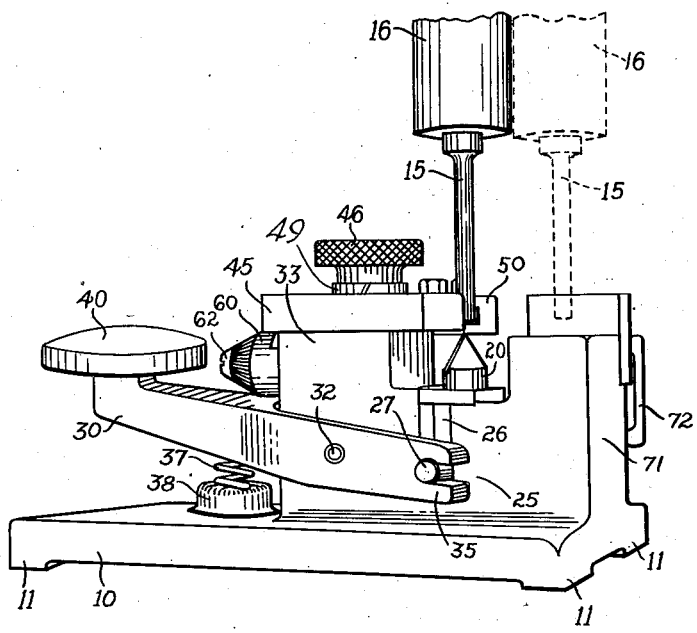

In operation, the slide 45 is set in a predetermined position relative to the member 33, and the entire device then brought into position beneath the drill to be sharpened. Tool 20 is in its lower position and may thus be moved underneath the end of the drill, into the relationship shown in Fig. 1. The device is so positioned that the drill is received in the open end of the arms 50, with its outer wall bearing against the two rollers 52.

The drill is rotated upon its own spindle, and while rotating the handle 40 is pressed by the operator to raise the tool into the position shown in Fig. 2 where its pointed end enters the lower open end of the drill. Further travel of the tool brings it into cutting and sharpening relation with the lower bevel 17 on the drill end, and pressure is then applied by hand to establish proper sharpening and cutting engagement. During this time the outer surface of the drill is supported against the two rollers 52 which are almost directly opposite the working portion of the tool 24, the tool being located on the side of support 20 adjacent member 33 so as to apply a force which tends to draw the tool rearwardly toward the rollers 52. A three point support is thus provided, the tool exerting a pressure on the inside of the drill which is equally divided and supported by the two rollers engaging the outside of the drill. This provides a highly accurate condition so that development of the proper angle on the drill end is assured, as well as establishing accurate concentric relation of the bevel with drill body. Further, the entire device is slidable upon its supporting surface so that it automatically finds the proper position and adjusts itself to the position where the proper sharpening action occurs.

With drills of different sizes, i. e. of different diameters, it is desirable to provide for some change in the setting of the slide 45 and of the guide rollers 52 relative to the tool. This may be accomplished through the relocation of the slide as provided for by the loosening and resetting of bolt 46. It is desirable, however, to provide an indexing means through adjustment of which the slide may be definitely set in one of a plurality of predetermined positions which will give the proper range of spacing for the usual drill sizes encountered. For this purpose an indexing member 60 is mounted upon the vertical face of the member 33 toward the upper end thereof. Member 60 is loosely rotatably mounted on bolt 62 threaded into the side wall of member 33. It has a working face which is divided into three portions shown in Fig. 6 and comprising faces 64, 65, and 66. Each of these faces extends over a third of the circumference and each of them is faced off at a different depth. The indexing element may be adjusted to bring any one of these three faces into operative position where it projects above the wall of member 33 and into position where it may be engaged by the rear end of slide 45.

When, for example, the member 60 is adjusted so that face 64 is exposed on its upper surface, slide 45 is moved forwardly to its maximum position thus providing for the closest relative approach of the guide members 52 and the tool end. To provide for sharpening drills of a larger range of sizes, face 65 is moved to the upper side and upon loosening of bolt 46 the slide 45 can be moved backwardly to an intermediate position providing larger spacing and adapting the device for drills of larger diameters. When the face 66 is moved uppermost, the slide 45 may be withdrawn still further, and the tool thus adapted for sharpening of a still larger range of drill sizes. It will be understood that in each case the member 60 serves merely as an indexing device, the slide being fastened in each of its several positions by the tightening of bolt 46.

It is also desirable to provide for removing the burr or wire edge which is formed at the lower end of the drill as a result of the sharpening operation. This is accomplished by the provision of a hone 70 formed of a plate of suitable material which is held in fixed position on an upwardly projecting portion 71 of the base by means clamp 72 and bolt 73. The upwardly projecting hone 70 is thus mounted in vertical position and in such manner that following the sharpening action, the device may be moved to bring the vertical face of the hone 70 against the outer wall of the drill, the device being manually pressed against the drill in order to develop the desired honing action while the drill rotates in its spindle. As will be clear, the hone is thus kept in a vertical plane and the outer surface of the tool and the cutting edge are thus maintained in accurate alignment.

The entire device is simple and inexpensive in construction and is readily portable so that it can be easily carried from one drill stand to another, as required, to provide for the proper sharpening action of each drill in its actual working position. The drills are not removed, but are operated in their normal location so that the entire sharpening operation is simplified and speeded up and at the same time accomplished with more accuracy and precision.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Sharpener for sharpening a hollow drill while the drill is rotatably supported in a spindle comprising a base adapted to be supported below the hollow end of said drill, a sharpening tool mounted in said base, means on said base for moving said tool into sharpening relation with the lower end of said drill while the drill is rotated in its spindle, and means on said base engaging the outside wall of said drill to establish proper operating relation of said drill and said tool during sharpening.

2. A sharpener for sharpening a hollow drill while the drill is rotatably supported in a spindle comprising a base adapted to be supported below the hollow end of said drill, a sharpening tool mounted in said base, means on said base for moving said tool into sharpening relation with the lower end of said drill while the drill is rotated in its spindle, and guide members on said base for engaging the outer wall of said drill as it is rotated to cause movement of said base over its supporting surface in response to pressure of said tool on the inside of said drill to properly center the tool thereon.

3. A sharpener for sharpening a hollow drill while the drill is rotatably supported in operative position in its spindle comprising a base adapted to be freely supported in slidable relation on a supporting surface below the hollow end of said drill, a sharpening tool, means for non-rotatably mounting said sharpening tool in said base providing for upward adjusting movement thereof, means on said base for urging said tool upwardly into sharpening relation with the inner surface of the hollow end of the drill while the drill is being rotated in its spindle, and a pair of spaced members on said base for engaging the outer wall of the drill as it is rotated to properly center said tool with respect to said drill in response to the pressure of said tool on the inside of said drill causing sliding movement of said base over its supporting surface.

4. A sharpener for sharpening a hollow drill while the drill is rotatably supported in operative position in its spindle comprising a base adapted to be slidably supported on a surface below the hollow end of said drill, a sharpening tool, means for non-rotatably mounting said sharpening tool in said base providing for upward adjusting movement thereof, means on said base for urging said tool upwardly into sharpening relation with the inner surface of the hollow end of the drill while the drill is being rotated in its spindle, and a pair of spaced rollers on said base for engaging the outer wall of the drill substantially opposite the working portion of said tool as the drill is rotated in its spindle.

5. A sharpener for sharpening a hollow drill while the drill is rotatably supported in operative position in its spindle comprising a base adapted to be slidably supported on a supporting surface below the hollow end of said drill, a sharpening tool, means for non-rotatably mounting said sharpening tool in said base providing for upward adjusting movement thereof, means on said base for urging said tool into sharpening relation with the inner surface of the hollow end of the drill while the drill is being rotated in its spindle, guide means on said base for engaging the outer wall of the drill as it is rotated in its spindle, and means for adjusting the spacing of said guide means relative to said tool to provide for sharpening drills of different sizes.

6. A sharpener for sharpening a hollow drill while the drill is rotatably supported in a spindle comprising a base adapted to be freely supported and movable in a horizontal plane below the hollow end of said drill, a sharpening tool mounted in said base, means on said base for moving said tool upwardly into sharpening relation with the lower end of said drill while said drill is rotated in its spindle, and honing means positioned on said base to properly engage with the sharpened end of said drill for removing burrs therefrom following the sharpening action by moving said base in said horizontal plane with respect to said drill.

7. A sharpener for sharpening a hollow drill while the drill is rotatably supported in operative position in its spindle comprising a base adapted to be freely supported and movable in a horizontal plane below the hollow end of said drill, a sharpening tool mounted in said base, means on said base for moving said tool into sharpening relation with the lower end of said drill while said drill is rotated in its spindle, and means for supporting a hone in fixed relation upon said base and in a vertical position adjacent said tool providing for properly engaging the lower end of said drill while rotating in its spindle to remove burrs therefrom following the sharpening action when said base is moved in said horizontal plane with respect to said drill.

8. A sharpener for sharpening a hollow drill while the drill is rotatably supported in its spindle comprising a base member adapted to be slidably supported below the hollow end of the drill, a sharpening tool, means for non-rotatably supporting said tool upon said base providing for movement thereof upwardly into engaging relation with the hollow end of the drill, manually operated means for urging said tool into sharpening relation with said drill, and adjustable means mounted on said base for engaging the outside of the drill in predetermined spaced relation with the tool to guide and support the tool during the sharpening operation.

9. A sharpener for sharpening a hollow drill while the drill is rotatably supported in its spindle and being driven thereby comprising a base member adapted to be slidably supported below the hollow end of the drill, a sharpening tool, means for nonrotatably supporting said tool upon said base providing for movement thereof into engaging relation with the hollow end of the drill, manually operated means non-yieldably connected with said base member for urging said tool into sharpening relation with said drill, said tool having a conically shaped end providing for the self-centering movement of said base and tool as the tool is urged into sharpening relation with the end of the drill.

10. A sharpener for sharpening a hollow drill while the drill is rotatably supported in its spindle comprising a base member adapted to be slidably supported below the hollow end of the drill, a sharpening tool, means for non-rotatably supporting said tool upon said base providing for movement thereof into engaging relation with the hollow end of the drill, manually operated means for urging said tool into sharpening relation with said drill, said tool having a conically shaped end providing for the self-centering movement of said base and tool as the tool is urged into sharpening relation with the end of the drill, and means mounted on said base for engaging the outside of the drill in predetermined spaced relation with the tool to guide and support the drill during the sharpening operation.

11. A sharpener for sharpening a hollow drill while the drill is rotatably supported in its spindle comprising a base member adapted to be slidably supported below the hollow end of the drill, a sharpening tool, means for non-rotatably supporting said tool upon said base providing for movement thereof into engaging relation with the hollow end of the drill, manually operated means for urging said tool into sharpening relation with said tool, adjustable means mounted on said base for engaging the outside of the drill in predetermined spaced relation with the tool to guide and support the drill during the sharpening operation, and indexing means having a plurality of positions for locating said adjustable means in different relative positions upon said base to provide for receiving and sharpening drills of different size.

12. A sharpener for sharpening a hollow drill comprising a base member adapted to be slidably mounted below the hollow end of said drill, a sharpening tool having a single cutting edge adapted to be received in said base member and inwardly of the hollow end of the drill in predetermined angular relationship thereto, means on said base member for engaging the outer surface of the drill substantially opposite the point of engagement of said cutting edge on the inner surface thereof, and means also on said base member for urging said cutting edge into engagement with the inner end of said drill during relative rotation of the tool and drill and adapted to control the pressure applied between said cutting edge and said drill to provide a sharpened beveled edge on the drill concentric with the outer surface of the drill.

13. A sharpener for sharpening a hollow drill while said drill is being rotated in its spindle comprising a base member, a conically shaped sharpening tool positioned within said base member having a single cutting edge adapted to be received inwardly of the hollow end of the drill, a slide adjustably mounted on said base member, means on said slide for engaging the outer surface of said drill at a plurality of spaced points to provide a guiding action for the sharpening tool, and means for moving said sharpening tool into the hollow end of the drill during relative rotation therebetween to form a square, sharpened lower edge with an internally beveled surface concentric with the body of the drill.

WILLIAM R. SPILLER.
LLOYD L. WEST.

REFERENCES CITED

The following references are of record in the file of this patent:

UNITED STATES PATENTS

| Number | Name | Date |
|---|---|---|
| 566,123 | Bailey | Aug. 18, 1896 |
| 806,011 | Smart | Nov. 28, 1905 |
| 2,005,827 | Lewis et al. | June 25, 1935 |
| 2,141,712 | Gylleck | Dec. 27, 1938 |

FOREIGN PATENTS

| Number | Country | Date |
|---|---|---|
| 553,894 | Great Britain | June 9, 1943 |